(12) United States Patent
Sun et al.

(10) Patent No.: US 12,198,305 B2
(45) Date of Patent: Jan. 14, 2025

(54) GPU-ACCELERATED DATA PROCESSING METHOD FOR RAPID NOISE-SUPPRESSED CONTRAST ENHANCEMENT

(71) Applicant: National Taiwan University, Taipei (TW)

(72) Inventors: Chi-Kuang Sun, Taipei (TW); Bhaskar Jyoti Borah, Taipei (TW)

(73) Assignee: National Taiwan University, Taipei (TW)

( * ) Notice: Subject to any disclaimer, the term of this patent is extended or adjusted under 35 U.S.C. 154(b) by 382 days.

(21) Appl. No.: 17/827,816

(22) Filed: May 30, 2022

(65) Prior Publication Data
US 2023/0385988 A1 Nov. 30, 2023

(51) Int. Cl.
*G06T 5/70* (2024.01)
*G06T 5/20* (2006.01)

(52) U.S. Cl.
CPC .................. *G06T 5/70* (2024.01); *G06T 5/20* (2013.01); *G06T 2207/20224* (2013.01)

(58) Field of Classification Search
CPC ... G06T 5/70; G06T 5/20; G06T 2207/20224; G06T 5/90
USPC .......................................................... 382/254
See application file for complete search history.

(56) References Cited

U.S. PATENT DOCUMENTS

| 9,536,337 | B1 * | 1/2017 | Erickson | G06T 5/73 |
| 2010/0142790 | A1 * | 6/2010 | Chang | G06T 5/70 382/274 |
| 2020/0250797 | A1 * | 8/2020 | Park | G06T 5/75 |

FOREIGN PATENT DOCUMENTS

| CN | 112488958 A | * | 3/2021 | |
| CN | 109785264 B | * | 11/2021 | |
| WO | WO-2017166301 A1 | * | 10/2017 | G06T 5/00 |

* cited by examiner

*Primary Examiner* — Tom Y Lu
*Assistant Examiner* — Pardis Sohraby
(74) *Attorney, Agent, or Firm* — Chun-Ming Shih; HDLS IPR SERVICES (57) ABSTRACT

The present disclosure relates to a data processing method, and more specifically, to a digital image processing method to enable a rapid noise-suppressed contrast enhancement in an optical linear or nonlinear microscopy imaging application. The disclosed method digitally mimics a hardware-based feedback-driven adaptive or controlled illumination technique by means of digitally resembling selective laser-on and laser-off states so as to selectively optimize the signal strength and hence the visibility of the weak-intensity morphologies while mostly preventing saturation of the brightest structures.

13 Claims, 9 Drawing Sheets

GPU-ACCELERATED DATA PROCESSING METHOD FOR RAPID NOISE-SUPPRESSED CONTRAST ENHANCEMENT

TECHNICAL FIELD

The present disclosure relates to a data processing method, and more particularly, to a digital image processing method for rapid noise-suppressed contrast enhancement.

BACKGROUND OF THE INVENTION

Optical neuronal imaging helps researchers investigate various neurological disorders as well as brain functions and dysfunctions. Neuronal structures usually show significant variation in structural texture and signal intensity distribution. For instance, when imaging neurons, it is often observed that the cell bodies (i.e., the somas) are way brighter than adjacent fiber structures (i.e., the axons and dendrites) which can be even thinner than a micron. As a matter of fact, neuronal imaging leads to a wide enough signal intensity distribution. Even if an advanced state-of-the-art acquisition and display system is adopted, owing to its limited dynamic range, it is often difficult to digitize and visualize all the neuronal details without sacrificing any information. Besides that, various optical, electrical, and other environmental factors contribute to a noisy background which significantly contaminates the weak intensity signals emerging from the ultrafine neuronal structures, and eventually deteriorates both the signal-to-noise ratio (SNR) and the contrast ratio for such morphologies.

A traditional contrast enhancement of the weak intensity structures often makes the brightest structures saturated, and might cause a noise amplification issue which can further degrade the SNR.

An adaptive/controlled illumination is a promising technique that allows real-time local optimization of the signal strength by means of regulating the laser excitation power. However, adaptive illumination requires a dedicated hardware set up, and owing to a slower electronic response, a poor effective bandwidth and hence an irreversible loss of digital resolution (aliasing) might be noticed, especially when targeting a high digital resolution over an extended field-of-view. In addition, adaptive illumination might still encounter noise amplification while locally enhancing the weak intensity structures.

U.S. Pat. No. 9,639,915B1 disclosed an image processing method includes configuring a noise reduction filter for each of pixels in an image in accordance with a linear noise model of the image, based on different levels of a noise effect caused to a corresponding pixel, among the pixels, by other pixels, among the pixels and adjacent to the corresponding pixel. The method further includes performing noise reduction filtering on each of the pixels, using the noise reduction filter for each of the pixels, to obtain a noise reduced image.

U.S. Pat. No. 8,417,050B1 employed robust filtering at each of a number of scales, or resolutions, within a signal, such as a still image or video sequence. In certain embodiments, robust filtering comprises or includes a non-linear neighborhood operation at each scale in order to produce both a denoised, sharpened and contrast-enhanced signal and a correction signal at each scale.

Although quite a lot of analog/digital signal processing methods have been proposed to date, the existing hardware-based analog techniques require dedicated hardware configurations to operate which increase the cost and complexity. A slower response owing to electronic limitations might lead to a poor effective bandwidth, which can in turn result in aliasing. Aside from the hardware-based methods, existing software-based contrast-enhancement algorithms often result in unwanted noise-amplification leading to a poor signal-to-noise ratio, and often ends up saturating the brightest structures in the image.

It is therefore necessary to introduce a digital noise-compensated contrast enhancement technology which can be applied to optical linear and nonlinear imaging modalities to help improve the visibility of the weak-signal structures while neither saturating the brightest ones nor amplifying the background noise.

SUMMARY OF THE INVENTION

The object of the invention is to provide a dedicated-hardware-free digital method which can mimic a hardware-based adaptive/controlled illumination technique and selectively improve the contrast ratio of the weak-intensity structures in an optical microscopy image, while not much affecting the structures with brighter intensities. The method employs an efficient background noise suppression followed by a local intensity enhancement.

In the first aspect, the invention provides a data processing method for rapid noise-suppressed contrast enhancement, the data processing method comprising configuring a graphical processing unit or a central processing unit to execute the following steps: obtaining an input image, wherein the input image has a first width and first height, and includes a plurality of pixels or data points with a specific bit-depth allowing a maximum pixel value or a maximum pixel intensity obtained as 2 raised to the power of the bit-depth minus 1; performing a first pixel-binning or a first interpolation process on the input image to resize the input image by a first reduction factor to generate a first resized image having a second width lower than the first width by the first reduction factor, and a second height lower than the first height by the first reduction factor; performing a first low-pass filtering process on the first resized image to obtain a first blurred image; performing a second interpolation process on the first blurred image to upscale it from the second width and second height to obtain a second resized image having the first width and first height; performing a division process to divide a first specific number by the second resized image to obtain a first division layer image; performing a thresholding process to truncate the first division layer image at a user-defined threshold value to obtain a first amplification layer image; performing a first amplification process on the input image to multiply the input image by the first amplification layer image to generate a first amplified image; performing a second pixel-binning or a third interpolation process on the first amplified image to resize the first amplified image by a second reduction factor to generate a third resized image having a third width lower than the first width by the second reduction factor, and a third height lower than the first height by the second reduction factor; performing a second low-pass filtering process on the third resized image to obtain a second blurred image; performing a fourth interpolation process on the second blurred image to upscale it from the third width and third height to obtain a fourth resized image having the first width and first height; performing a first subtraction process on the fourth resized image and the first amplified image to subtract the first amplified image from the fourth resized image to generate a first subtracted image; performing a third low-pass filtering process on the first subtracted image to obtain a third blurred image; performing a second subtraction process on the first amplification layer image to subtract the first amplification layer image from a second specific number higher than the user-defined threshold value to obtain a second subtracted image or a second amplification layer image; performing a second amplification process on the third blurred image to multiply the third blurred image by the second amplification layer image to generate a second amplified image; performing a third subtraction process on the input image and the second amplified image to subtract the second amplified image from the input image to obtain a third subtracted image; performing a set of arithmetic processes on the first amplification layer image to obtain a third amplification layer image; performing a third amplification process on the third subtracted image to multiply the third subtracted image by the third amplification layer image to generate a third amplified image or a noise-suppressed contrast enhanced output image.

In preferred embodiments, the first interpolation process, the second interpolation process, the third interpolation process, and the fourth interpolation process are bilinear.

In preferred embodiments, the first reduction factor in the first pixel-binning or the first interpolation process is 10.

In preferred embodiments, the first low-pass filtering process involves a Gaussian blur operation performing a convolution using a Gaussian kernel with a first kernel size of 29×29.

In preferred embodiments, an addition process is performed on the first blurred image to add a non-zero number to the first blurred image prior to performing the second interpolation process.

In preferred embodiments, the first specific number in the division process is 90% of the maximum pixel intensity.

In preferred embodiments, the user-defined threshold value in the thresholding process is in a range of 3.0 to 8.0, allowing floating point numbers.

In preferred embodiments, the second reduction factor in the second pixel-binning or the third interpolation process is 3.

In preferred embodiments, the second low-pass filtering process involves a Gaussian blur operation performing a convolution using a Gaussian kernel with a second kernel size of 29×29.

In preferred embodiments, the third low-pass filtering process involves a Gaussian blur operation performing a convolution using a Gaussian kernel with a third kernel size of 7×7.

In preferred embodiments, the second specific number in the second subtraction process is 1.25 times the user-defined threshold value.

In preferred embodiments, the set of arithmetic processes on the first amplification layer image to obtain the third amplification layer image, comprises:

first, to divide the first amplification layer image by a division factor of 4 to obtain a second division layer image, second, to raise the second division layer image to a power of 2 to obtain a modified division layer image, and third, to add a value of 0.9 to the modified division layer image to obtain the third amplification layer image.

BRIEF DESCRIPTION OF THE DRAWINGS

FIG. 5(a)-(d) is a diagram demonstrating a comparison between multiple input images and the respective processed images.

DETAILED DESCRIPTION OF THE INVENTION

In order to better understand the disclosure for those skilled in the art, the technical solutions in the embodiments of the present disclosure are clearly and completely described in the following with reference to the accompanying drawings in the embodiments of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

According to the invention, the input image is acquired by means of large field-of-view (FOV) Nyquist-satisfied (aliasing-free) two-photon fluorescence imaging of brain/neuronal structures at multiple excitation wavelengths with a custom developed multiphoton optical microscopy (MPM) system. The disclosed method of the invention successfully retrieves weak-intensity ultrafine neuronal structures contaminated by a strong noisy background. The disclosed method enables simultaneous improvements to the signal-to-noise ratio (SNR), signal-to-background ratio (SBR), and contrast-ratio. By means of Graphics Processing Unit (GPU)-assisted NVIDIA's Compute Unified Device Architecture (CUDA)-acceleration, the disclosed method enables a <3 ms of time-complexity for a typical 1000×1000-sized 16-bit unsigned image.

The Disclosed Data Processing Method of the Invention

Figure 1:
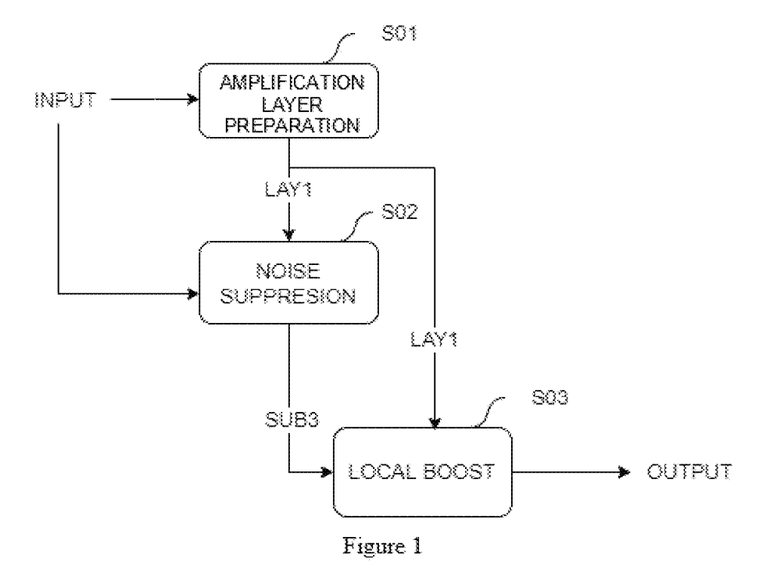
FIG. 1 is a block diagram showing the arrangement of a data processing method according to the present invention.
Figure 2:
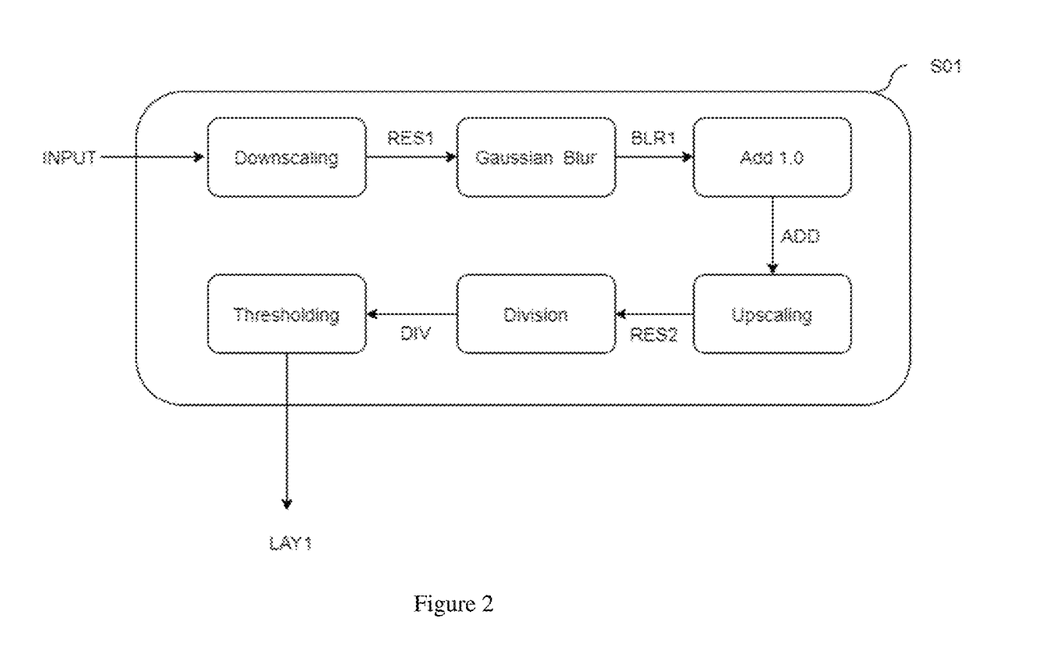
FIG. 2 is a flowchart illustrating an amplification layer preparation process.
Figure 3:
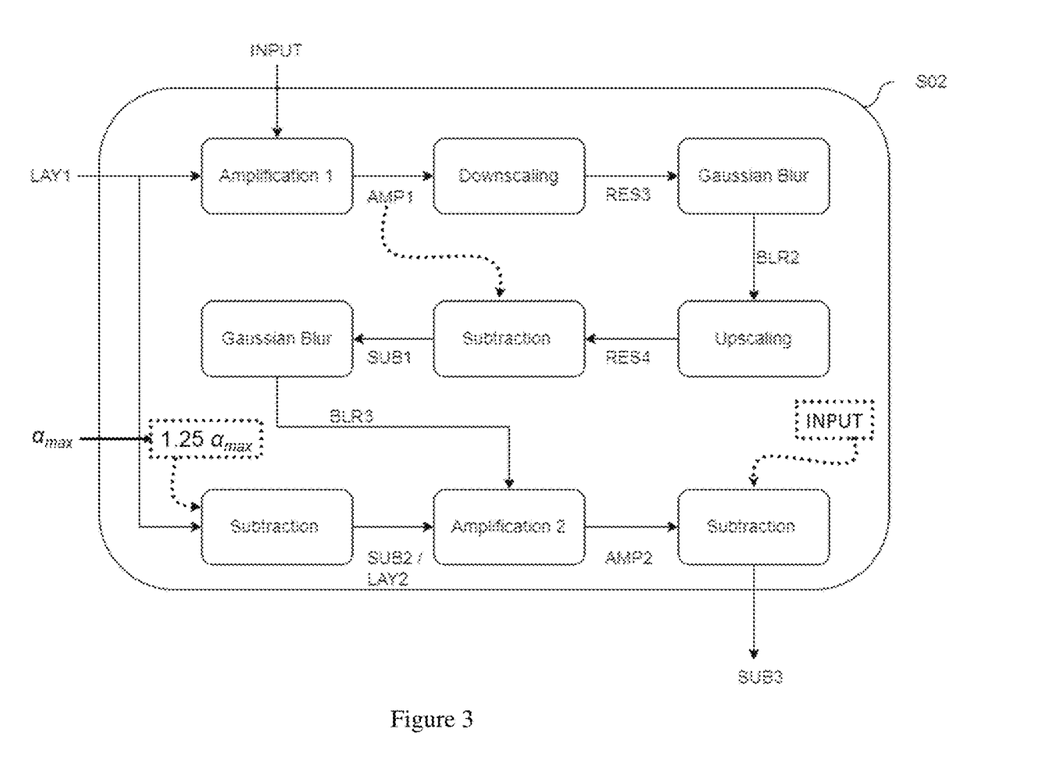
FIG. 3 is a flowchart illustrating a noise suppression process.
Figure 4:
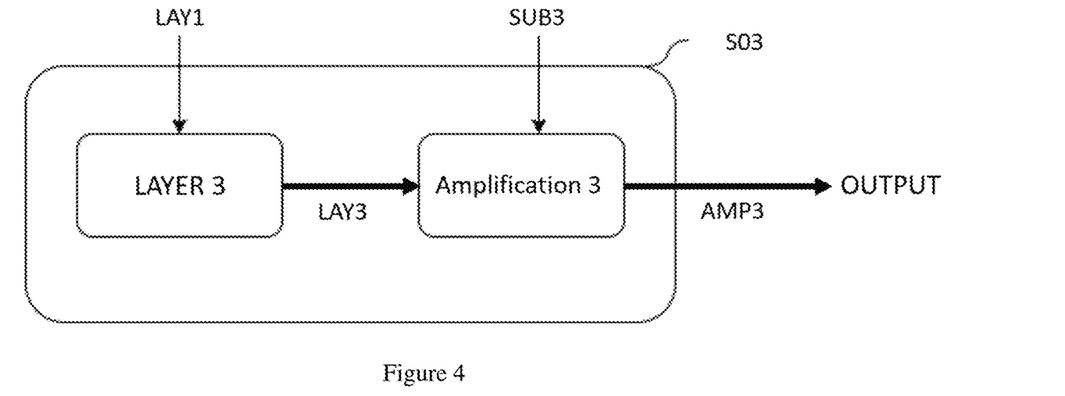
FIG. 4 is a flowchart illustrating a local boost process.

FIG. 1 illustrates the overview of the data processing method in accordance with an embodiment of the disclosure. FIG. 2 illustrates a flowchart of a process to obtain a first amplification layer image in accordance with an embodiment of the disclosure. FIG. 3 illustrates a flowchart of a noise suppression process in accordance with an embodiment of the disclosure. FIG. 4 illustrates a flowchart of a local boost process in accordance with an embodiment of the disclosure.

As shown in FIG. 1, an input image INPUT is performed with an amplification layer preparation process S01 to obtain a first amplification layer LAY1. The first amplification layer LAY1 is performed with noise suppression process S02 to obtain a noise suppressed version SUB3. The noise suppressed version SUB3 is performed with local boost process S03 to obtain a processed image as an output.

The INPUT is a noise-contaminated low-contrast 16-bit image that can be represented as f(r,c) with R×C pixels, where r and c stand for row and column positions, respectively.

According to the process S01, a 10× downscaling is first applied to f(r,c), and a first resized image $f^D(r', c')$ is obtained with a reduced pixel number of R'×C'; refer to Equation (1), and RES1 in FIG. 2. For all R'×C'-pixel images, r' and c' stand for row and column positions, respectively. $f^D(r', c')$ is low-pass filtered with a 29×29-kernel Gaussian blur to yield a first blurred image; refer to BLR1 in FIG. 2. Each pixel of BLR1 is added with 1.0 to avoid division-by-zero in a following step; refer to l(r', c') in Equation (2), and ADD in FIG. 2. l(r', c') is resized back to R×C pixels by means of a bilinear interpolation yielding a second resized image; refer to $l^U(r, c)$ in Equation (3), and RES2 in FIG. 2. Inverse of each $l^U(r, c)$-pixel-value is multiplied with 90% of the maximum allowed intensity, that is 0.9×(216−1) for a 16-bit image, to generate a first division layer image; refer to d(r,c) in Equation (4), and DIV in FIG. 2. Pixel values in d(r,c) that are above a user defined threshold $\alpha_{max}$ are truncated to $\alpha_{max}$ to yield a first amplification layer image; refer to α(r, c) in Equation (5), and LAY1 in FIG. 2. LAY1 would be used in the following noise suppression process S02. In the embodiments, the user defined threshold $\alpha_{max}$ is ranging from 3.0 to 8.0, allowing floating point numbers.

$$f(r, c) \xrightarrow{10\times downscaling}_{R\times C \to R'\times C'} f^D(r', c'), \quad \text{Equation (1)}$$

$$l(r', c') = [G_{29\times 29} \otimes f^D(r', c')] + 1.0, \quad \text{Equation (2)}$$

$$l(r', c') \xrightarrow{Upscaling}_{R'\times C' \to R\times C} l^U(r, c), \quad \text{Equation (3)}$$

$$d(r, c) = \frac{0.9\times(2^{16}-1)}{l^U(r, c)}, \quad \text{Equation (4)}$$

$$\alpha(r, c) = \begin{cases} \alpha_{max}, & \text{if } d(r, c) > \alpha_{max} \\ d(r, c), & \text{otherwise} \end{cases} \quad \text{Equation (5)}$$

According to the process S02, the INPUT or f(r,c) is first pixel-wise multiplied with the LAY1 or α(r, c) to yield a first amplified image; refer to AMP1 in FIG. 3, and g(r, c) in Equation (6). g(r, c) is applied with a 3× downscaling to yield a third resized image; refer to RES3 in FIG. 3, and $g^D(r'', c'')$ in Equation (7), where r'' and c'' respectively stand for row and column positions. $g^D(r'', c'')$ is with a reduced pixel number of R''×C''. $g^D(r'', c'')$ is low-pass filtered with a 29×29-kernel Gaussian blur to yield a second blurred image; refer to BLR2 in FIG. 3, and L(r'', c'') in Equation (8). L(r'', c'') is resized back to R×C pixels by means of a bilinear interpolation yielding a fourth resized image; refer to RES4 in FIG. 3, and $L^U(r, c)$ in Equation (9). g(r, c) is subtracted from $L^U(r, c)$ to yield a first subtracted image; refer to SUB1 in FIG. 3. SUB1 is low-pass filtered with a 7×7-kernel Gaussian blur to yield a third blurred image; refer to BLR3 in FIG. 3, and L'(r, c) in Equation (10). α(r, c) is performed with a subtraction operation, that is [1.25×$\alpha_{max}$−α(r, c)] to yield a second subtracted image or a second amplification layer image; refer to SUB2 or LAY2 in FIG. 3. Subsequently, L'(r, c) or BLR3 is pixel-wise multiplied with SUB2 or LAY2 yielding a second amplified image; refer to AMP2 in FIG. 3. AMP2 is subtracted from f(r, c) or INPUT to obtain a third subtracted image; refer to SUB3 in FIG. 3, and S(r, c) in Equation (11). SUB3 or S(r, c) is a noise-suppressed version of the INPUT or f(r, c), that would be used in the following local boost process S03.

$$g(r, c) = f(r, c) \times \alpha(r, c), \quad \text{Equation (6)}$$

$$g(r, c) \xrightarrow{3\times downscaling}_{R\times C \to R''\times C''} g^D(r'', c''), \quad \text{Equation (7)}$$

$$L(r'', c'') = G_{29\times 29} \otimes g^D(r'', c''), \quad \text{Equation (8)}$$

$$L(r'', c'') \xrightarrow{Upscaling}_{R''\times C'' \to R\times C} L^U(r, c), \quad \text{Equation (9)}$$

$$L'(r, c) = G_{7\times 7} \otimes [L^U(r, c) - g(r, c)], \quad \text{Equation (10)}$$

$$S(r, c) = f(r, c) - L'(r, c) \times [1.25\times \alpha_{max} - \alpha(r, c)], \quad \text{Equation (11)}$$

According to the process S03, LAY1 or α(r, c) is performed with a set of arithmetic operations, given as, $[X+\{\alpha(r, c)/Y\}^n]$ to generate a third amplification layer image; refer to LAY3 in FIG. 4. In one embodiment, the values of X, Y, and n are chosen to be 0.9, 4.0, 2.0, respectively. The third subtracted image, that is S(r, c), namely SUB3 is pixel-wise multiplied with LAY3, yielding a third amplified image or a noise-suppressed contrast enhanced output image; refer to OUTPUT in FIG. 4, and F(r, c) in Equation (12).

$$F(r,c) = S(r,c) \times [0.9 + \{\alpha(r,c)/4.0\}^{2.0}], \quad (12)$$

A high-intensity region in INPUT would result in close-to-1 values in the corresponding region in LAY3, thereby preventing saturation in OUTPUT when SUB3 is multiplied with LAY3. Whereas, a low-intensity region in INPUT would result in greater-than-1 values in the corresponding region in LAY3, thereby locally enhancing the low-intensity region in OUTPUT when SUB3 is multiplied with LAY3.

An application of the disclosed data processing method is demonstrated with two-photon excitation fluorescence (TPEF) images of a Nav1.8-tdTomato-positive mouse dorsal-root-ganglion (DRG) section, and a coronal section from a Thy1-GFP-positive mouse brain cortex region. The DRG section comprises of bright somas and weak-intensity fine axon fibers, and the cortex section comprises of axons, dendrites, and dendritic-spines. TPEF imaging is performed at central excitation wavelengths of 1070 nm and 919 nm (70 MHz, <60 fs, <40 mW average excitation power) for the Nav1.8-tdTomato- and Thy1-GFP-positive specimens, respectively.

Figure 5:
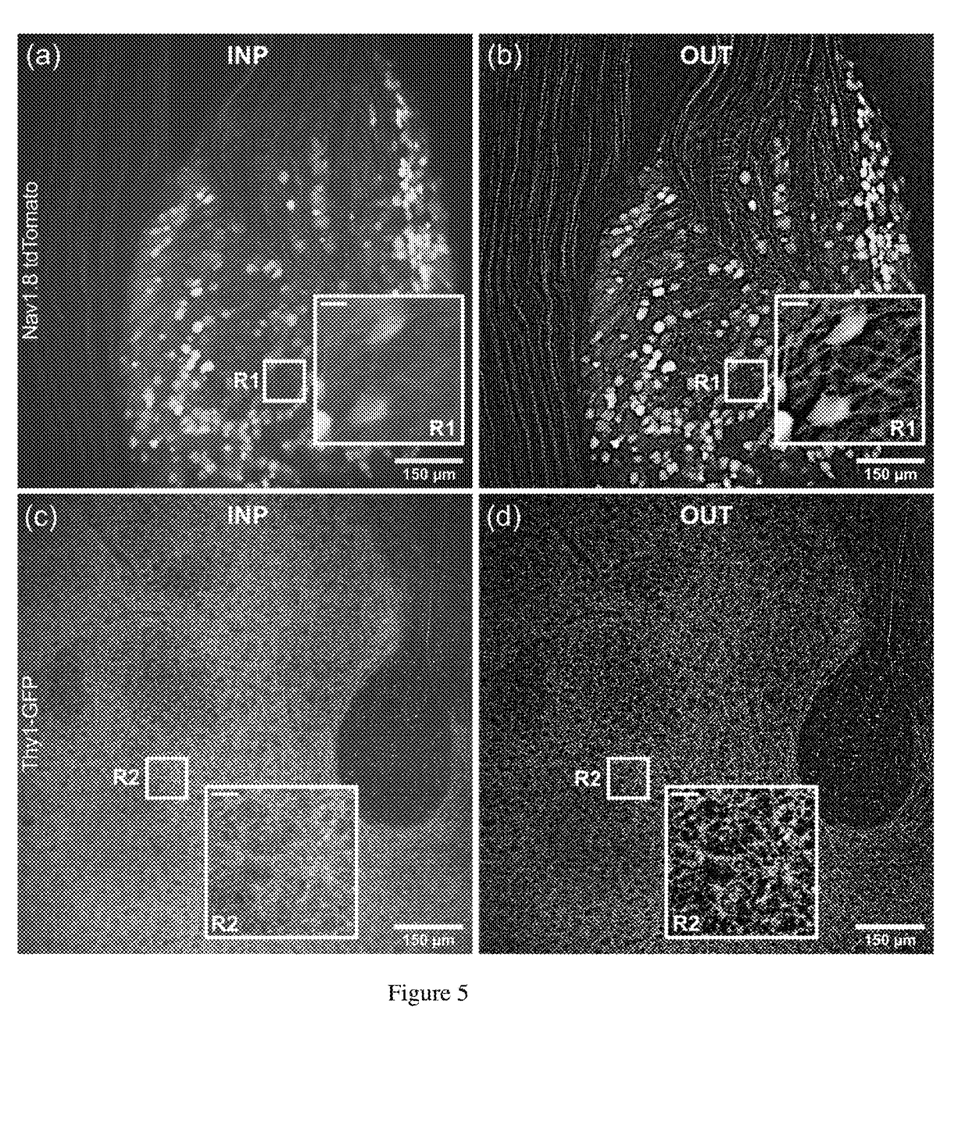

FIGS. 5(a) and (c) depict two TPEF images of the Nav1.8-tdTomato and Thy1-GFP specimens, respectively, each with a scale bar of 150 μm. Both FIGS. 5(a) and (c) show poor SNR, SBR, and contrast-ratio. The data processing method disclosed in this invention is applied, following $\alpha_{max}$=8.0 for the image in FIG. 5(a), and $\alpha_{max}$=6.0 for the image in FIG. 5(c), and the processed images are shown in FIGS. 5(b) and (d), respectively. The disclosed data processing method yields significant image quality improvement in each case.

Figure 6:
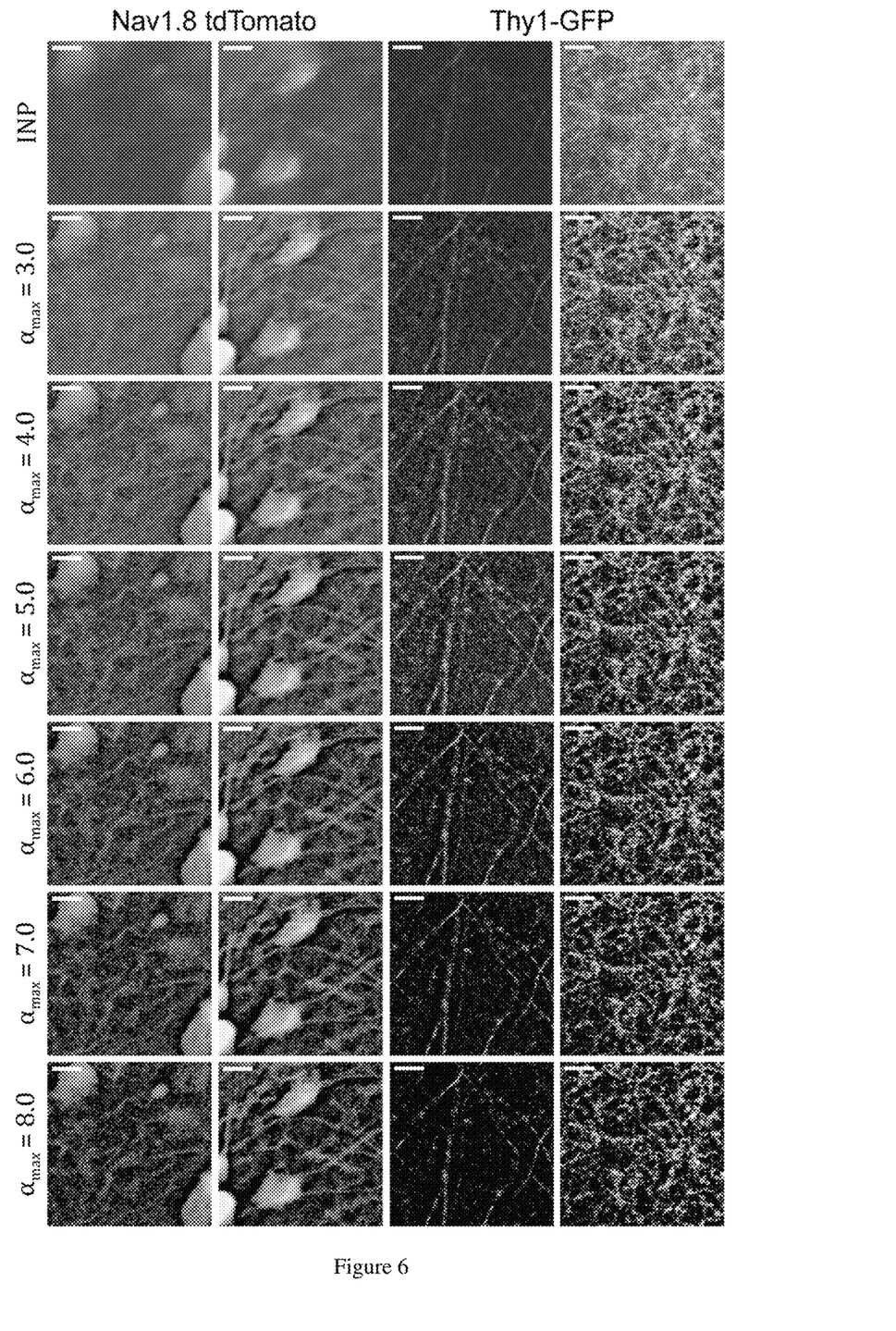
FIG. 6 is a diagram demonstrating the single-parametric control of $\alpha_{max}$.

FIG. 6 is provided with two regions-of-interest (ROIs) for the Nav1.8-tdTomato image, and two ROIs for the Thy1-GFP image taken from FIGS. 5(a) and (c), respectively, with an aim to quantitatively visualize the effect of $\alpha_{max}$. The first row, that is INP in FIG. 6 depicts the unprocessed ROIs. The succeeding rows depict the processed ROIs at different values of $\alpha_{max}$ varying from 3.0 to 8.0, sequentially.

Figure 7:
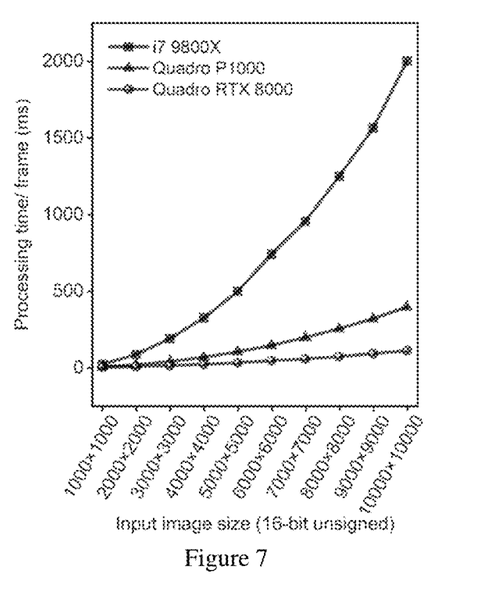
FIG. 7 is a time-complexity plot showing the average processing time for the disclosed data processing method.

FIG. 7 plots average processing time for the disclosed data processing method in milliseconds with respect to input image size (16-bit unsigned format). The average processing time includes uploading an unprocessed input image from a host to a GPU, processing the uploaded image in the GPU, and downloading a processed output image from the GPU to the host. The first curve from above (the curve with square blocks) plots average processing time via a conventional CPU i7-9800X consuming up-to ~2000 ms for a 10,000× 10,000-pixel 16-bit input image. The second and third curves (the curve with triangles and the curve with spheres) plot average processing time via two CUDA-enabled GPUs, which are Quadro P1000 and Quadro RTX 8000, respectively, each revealing a significant improvement to the processing speed. Quadro RTX 8000 consumes ~111 ms for the same 10,000×10,000-pixel 16-bit input image, indicating an 18 times performance boost in comparison to i7-9800X.

In one embodiment, an image acquisition and processing system is provided for rapid noise-suppressed contrast enhancement, accelerated with a graphics processing unit, with a digitally realized hardware-based adaptive/controlled illumination effect in an optical linear or nonlinear microscopy application, while securing a sub-3-millisecond time-complexity for a 1000×1000-pixel 16-bit input image.

Figure 8:
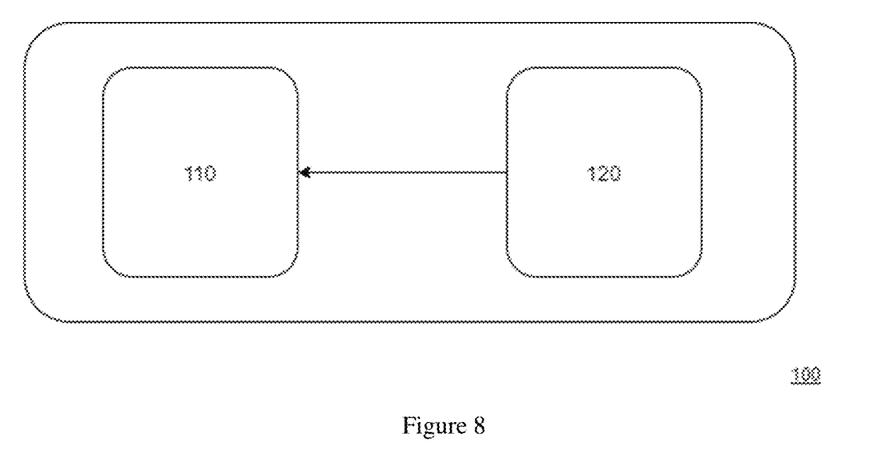
FIG. 8 is a block diagram demonstrating an image acquisition and processing system.

FIG. 8 is a diagram demonstrating an image acquisition and processing system 100. The image acquisition and processing system 100 comprises of a computer 110 with a Compute Unified Device Architecture (CUDA)-enabled graphics card, and an optical linear or nonlinear microscopy system 120 that is configured to acquire images of biological specimens with a high digital resolution.

Figure 9:
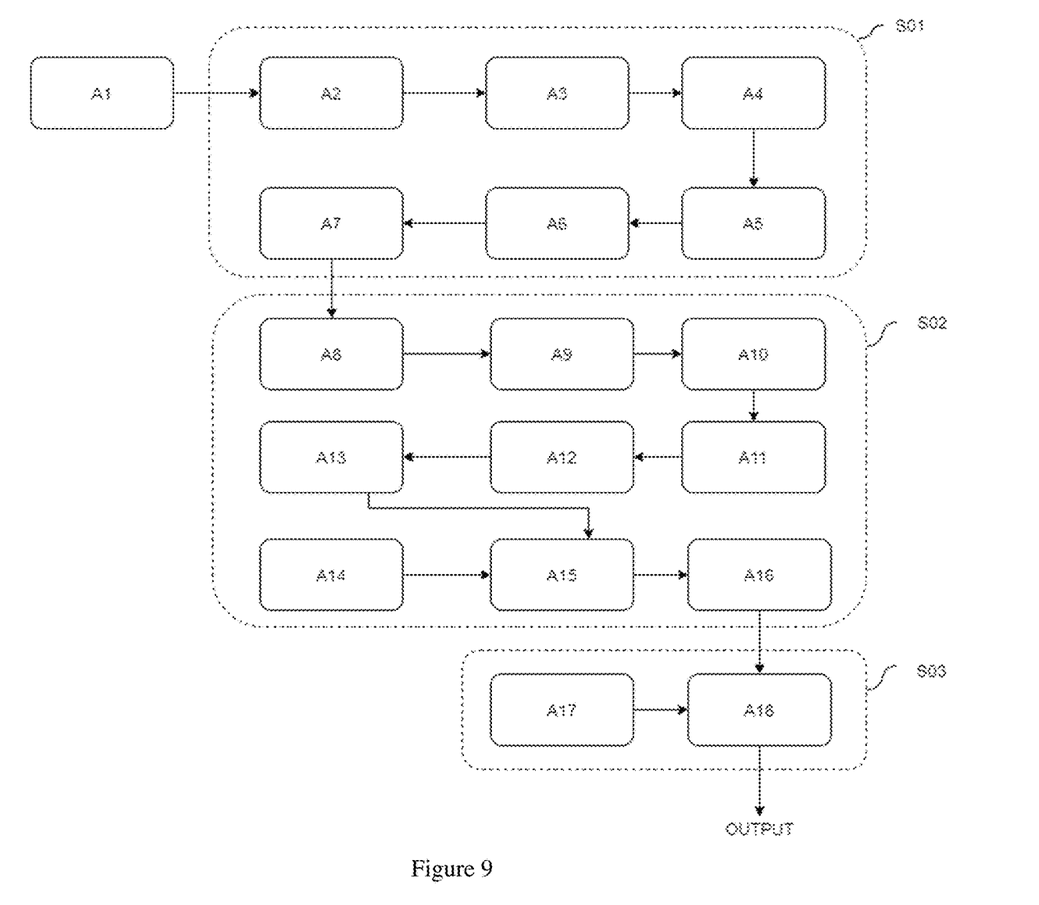
FIG. 9 is a block diagram showing the detailed arrangement of an image acquisition and processing system according to the present invention.

FIG. 9 is a block diagram showing the arrangement of the image acquisition and processing system 100. The image acquired by the optical linear or nonlinear microscopy system 120 is provided as input and processed with a data processing method dedicated to rapid noise-suppressed contrast enhancement that digitally mimics a hardware-based adaptive/controlled illumination technique; the data processing method comprising configuring a CUDA-enabled graphics processing unit of a computer 110 to execute the following steps.

A1: Obtaining a noise-affected low-contrast input image from an optical linear or nonlinear microscopy system, wherein the input image has a first width and first height, and includes a plurality of pixels or data points with a specific bit-depth allowing a maximum pixel value or a maximum pixel intensity obtained as 2 raised to the power of the bit-depth minus 1.

The amplification layer preparation process S01 comprises of the steps A2~A7.

A2: Performing a first bilinear interpolation process on the input image to resize the input image by a first reduction factor of 10, to generate a first resized image having a second width lower than the first width by the first reduction factor, and a second height lower than the first height by the first reduction factor.

A3: Performing a first Gaussian blur process on the first resized image by performing a convolution operation on the first resized image while using a Gaussian kernel with a first kernel size of 29×29, to obtain a first blurred image.

A4: Performing an addition process to add a non-zero number, that is 1.0, to the first blurred image to obtain a non-zero image.

A5: Performing a second bilinear interpolation process on the non-zero image to upscale it from the second width and second height to obtain a second resized image having the first width and first height.

A6: Performing a division process to divide 90% of the maximum pixel intensity by the second resized image to obtain a first division layer image.

A7: Performing a thresholding process to truncate the first division layer image at a user-defined threshold value within a range of 3.0 to 8.0, to obtain a first amplification layer image.

The noise suppression process S02 comprises of the steps A8~A16.

A8: Performing a first amplification process on the input image to multiply the input image by the first amplification layer image, and generate a first amplified image.

A9: performing a third bilinear interpolation process on the first amplified image to resize the first amplified image by a second reduction factor of 3, to generate a third resized image having a third width lower than the first width by the second reduction factor, and a third height lower than the first height by the second reduction factor.

A10: Performing a second Gaussian blur process on the third resized image by performing a convolution operation on the third resized image while using a Gaussian kernel with a second kernel size of 29×29, to obtain a second blurred image.

A11: Performing a fourth bilinear interpolation process on the second blurred image to upscale it from the third width and third height to obtain a fourth resized image having the first width and first height.

A12: Performing a first subtraction process on the fourth resized image and the first amplified image to subtract the first amplified image from the fourth resized image to generate a first subtracted image.

A13: Performing a third Gaussian blur process on the first subtracted image by performing a convolution operation on the first subtracted image while using a Gaussian kernel with a third kernel size of 7×7, to obtain a third blurred image.

A14: Performing a second subtraction process on the first amplification layer image to subtract the first amplification layer image from 1.25 times the user-defined threshold value, to obtain a second subtracted image or a second amplification layer image.

A15: Performing a second amplification process on the third blurred image to multiply the third blurred image by the second amplification layer image, and generate a second amplified image.

A16: Performing a third subtraction process on the input image and the second amplified image to subtract the second amplified image from the input image, to obtain a third subtracted image.

The local boost process S03 comprises of the steps A17 and A18.

A17: Performing a set of arithmetic processes on the first amplification layer image. First, to divide the first amplification layer image by a division factor of 4 to obtain a second division layer image, second, to raise the second division layer image to a power of 2 to obtain a modified division layer image, and third, to add a value of 0.9 to the modified division layer image to obtain a third amplification layer image.

A18: Performing a third amplification process on the third subtracted image to multiply the third subtracted image by the third amplification layer image, and generate a third amplified image or an output image with an enhanced contrast ratio.

In short, instead of a hardware-based solution, here the present disclosure reports a digital approach dedicated to rapid noise-suppressed contrast enhancement, which digitally mimics a feedback-driven adaptive/controlled illumination technique in an optical linear or nonlinear microscopy application.

All the documents mentioned in the present invention are incorporated in the present application by reference to the same extent as if each individual document is specifically and individually indicated to be incorporated by reference. In addition, it should be understood that after reading the contents taught in the present invention, various modifications and changes may be made to the present invention by those skilled in the art, and these equivalents also fall into the scope defined by the claims.

What is claimed:

1. A computer in an image acquisition and processing system for rapid noise-suppressed contrast enhancement, comprising a graphical processing unit or a central processing unit which is configured to execute the following steps:

obtaining an input image from an optical microscopy system in the image acquisition and processing system, wherein the optical microscopy system is configured for acquiring the input image of biological specimens, wherein the input image has a first width and first height, and includes a plurality of pixels or data points with a specific bit-depth allowing a maximum pixel value or a maximum pixel intensity;

performing a first pixel-binning or a first interpolation process on the input image to resize the input image by a first reduction factor to generate a first resized image having a second width lower than the first width by the first reduction factor, and a second height lower than the first height by the first reduction factor;

performing a first low-pass filtering process on the first resized image to obtain a first blurred image;

performing a second interpolation process on the first blurred image to upscale it from the second width and second height to obtain a second resized image having the first width and first height;

performing a division process to divide a first specific number by the second resized image to obtain a first division layer image;

performing a thresholding process to truncate the first division layer image at a user-defined threshold value to obtain a first amplification layer image;

performing a first amplification process on the input image to multiply the input image by the first amplification layer image to generate a first amplified image;

performing a second pixel-binning or a third interpolation process on the first amplified image to resize the first amplified image by a second reduction factor to generate a third resized image having a third width lower than the first width by the second reduction factor, and a third height lower than the first height by the second reduction factor;

performing a second low-pass filtering process on the third resized image to obtain a second blurred image;

performing a fourth interpolation process on the second blurred image to upscale it from the third width and third height to obtain a fourth resized image having the first width and first height;

performing a first subtraction process on the fourth resized image and the first amplified image to subtract the first amplified image from the fourth resized image to generate a first subtracted image;

performing a third low-pass filtering process on the first subtracted image to obtain a third blurred image;

performing a second subtraction process on the first amplification layer image to subtract the first amplification layer image from a second specific number higher than the user-defined threshold value to obtain a second subtracted image or a second amplification layer image;

performing a second amplification process on the third blurred image to multiply the third blurred image by the second amplification layer image to generate a second amplified image;

performing a third subtraction process on the input image and the second amplified image to subtract the second amplified image from the input image to obtain a third subtracted image;

performing a set of arithmetic processes on the first amplification layer image to obtain a third amplification layer image;

performing a third amplification process on the third subtracted image to multiply the third subtracted image by the third amplification layer image to generate a third amplified image or a contrast-optimized output image.

2. The computer of claim 1, wherein the first interpolation process, the second interpolation process, the third interpolation process, and the fourth interpolation process are bilinear.

3. The computer of claim 1, wherein the first reduction factor in the first pixel-binning or the first interpolation process is 10.

4. The computer of claim 1, wherein the first low-pass filtering process involves a Gaussian blur operation performing a convolution using a Gaussian kernel with a first kernel size of 29×29.

5. The computer of claim 1, wherein an addition process is performed on the first blurred image to add a non-zero number to the first blurred image prior to performing the second interpolation process.

6. The computer of claim 1, wherein the first specific number in the division process is 90% of the maximum pixel intensity.

7. The computer of claim 1, wherein the user-defined threshold value in the thresholding process is in a range of 3.0 to 8.0, allowing floating point numbers.

8. The computer of claim 1, wherein the second reduction factor in the second pixel-binning or the third interpolation process is 3.

9. The computer of claim 1, wherein the second low-pass filtering process involves a Gaussian blur operation performing a convolution using a Gaussian kernel with a second kernel size of 29×29.

10. The computer of claim 1, wherein the third low-pass filtering process involves a Gaussian blur operation performing a convolution using a Gaussian kernel with a third kernel size of 7×7.

11. The computer of claim 1, wherein the second specific number in the second subtraction process is 1.25 times the user-defined threshold value.

12. The computer of claim 1, wherein the set of arithmetic processes on the first amplification layer image to obtain the third amplification layer image, comprises:
   first, to divide the first amplification layer image by a division factor of 4 to obtain a second division layer image,
   second, to raise the second division layer image to a power of 2 to obtain a modified division layer image, and
   third, to add a value of 0.9 to the modified division layer image to obtain the third amplification layer image.

13. An image acquisition and processing system comprising the computer and the optical microscopy system as recited in any one of the claims 1-11,
   wherein the optical microscopy system is a Nyquist-satisfied and aliasing-free two-photon fluorescence imaging system configured with one or more excitation wavelengths to acquire the input image of biological specimens.

* * * * *